Aug. 26, 1930.      C. A. BEUCLER      1,774,223
FRUIT GATHERING DEVICE
Filed Jan. 25, 1928      2 Sheets-Sheet 1
Fig. 1.
Fig. 4.
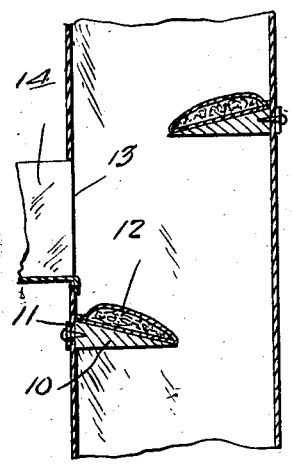
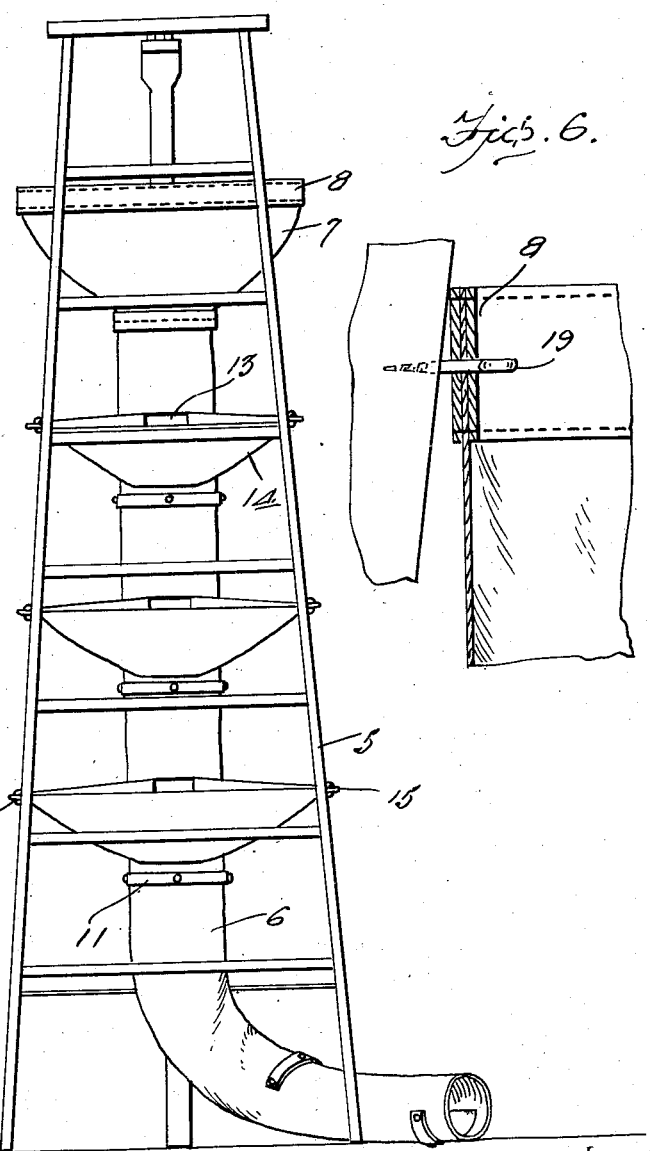
Fig. 6.
Inventor
C. A. Beucler
By Clarence A. O'Brien
Attorney

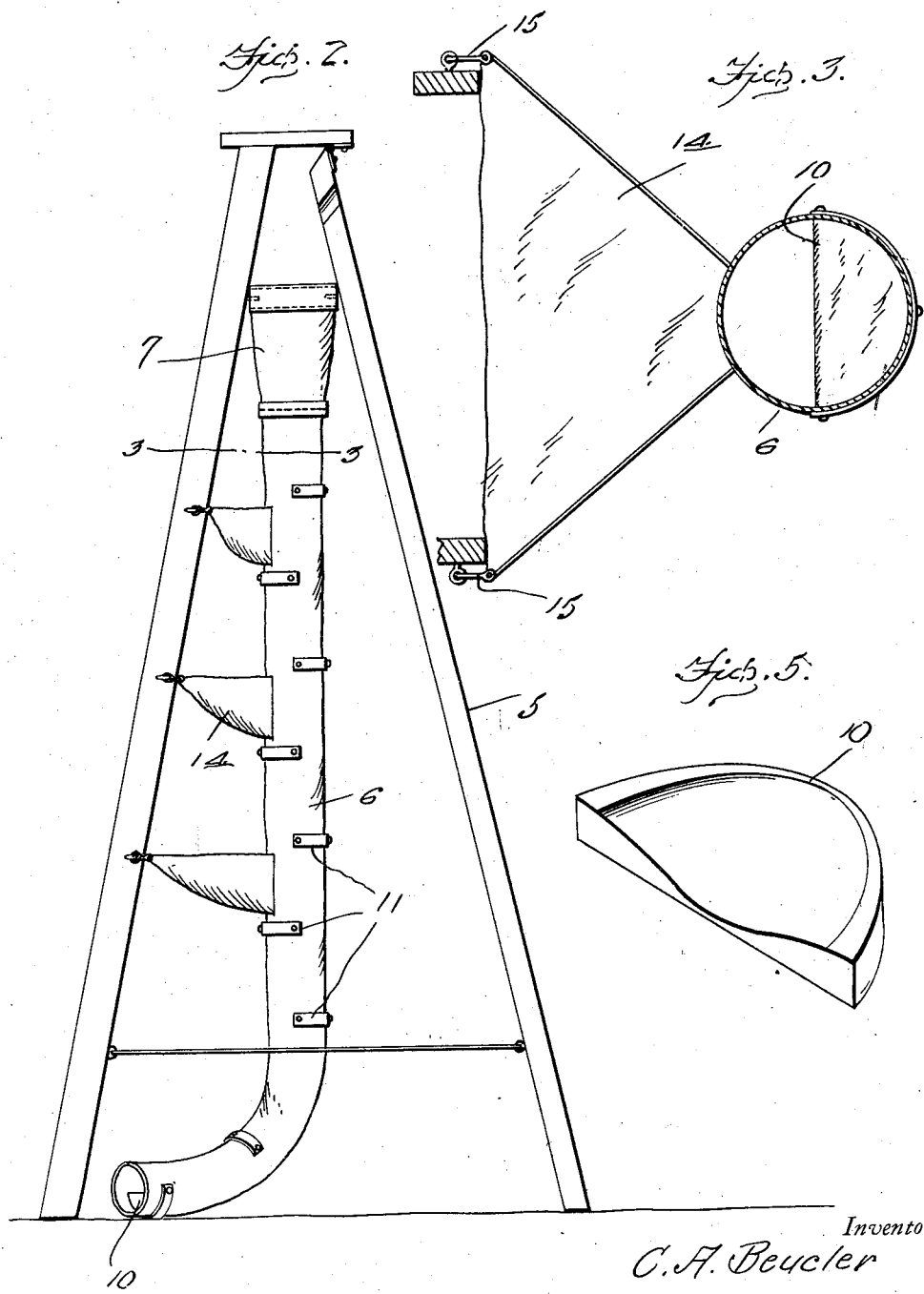

Patented Aug. 26, 1930

1,774,223

UNITED STATES PATENT OFFICE

CONDE A. BEUCLER, OF MEDFORD, OREGON

FRUIT-GATHERING DEVICE

Application filed January 25, 1928. Serial No. 249,349.

This invention relates to new and useful improvements in fruit gathering devices and aims to provide a fruit receiving trough or chute, attached to a ladder, whereby the fruit pickers at any point upon the ladder may pass the fruit into the chutes from whence it is conveyed to a container at the bottom of the chute or permitted to roll upon the ground uninjured.

One of the most important objects of this invention is to provide a fruit receiving trough or chute in association with a generally conventional fruit picker's ladder so that the combined unit may be moved from tree to tree and without requiring the attachment of the chute to the picker and without necessitating the picker holding upon the same, which is necessary in the use of most of the chute type of pickers now in use.

In the drawings wherein like reference characters indicate like parts throughout the several views thereof:

Figure 1 is a front elevation of my improved fruit picking ladder.

Figure 2 is a side elevation thereof.

Figure 3 is an enlarged horizontal section taken substantially upon the line 3—3 of Figure 2.

Figure 4 is a fragmentary longitudinal section through the fruit receiving chute or trough.

Figure 5 is a perspective of one of the uncushioned abutment plates arranged within the chute or trough to prevent the rapid descent of the fruit therethrough, and Figure 6 is a fragmentary section disclosing the manner of attachment between the upper end of the chute or trough unit to the ladder structure.

Now having particular reference to the drawings, 5 designates generally a conventional fruit picker's ladder. In carrying out the present invention there is provided an elongated chute or trough preferably of canvas or other heavy material, and designated by the reference character 6. The upper end of this chute or trough is equipped with a flared mouth 7 arranged around the upper end of which are inner and outer reinforcing bands 8—8, this reinforced end of the mouth being rigidly secured within the ladder 5 adjacent the upper end thereof as at 19 in Figure 6.

Arranged throughout the length of the trough 6 and at opposed sides thereof in staggered relation are interior semi-circular bumper plates 10 secured to the trough through the medium of metallic straps 11 arranged around the other side thereof and through which and said bumpers as well as the trough material are driven nails, tacks, screws, or other suitable fasteners. The top surface of each bumper plate 10 is preferably dished and arranged therein is a suitable cushion 12.

Directly above the bumper plate 10 adjacent the front side of the ladder 5 the trough is formed with openings 13 communicating with which are fabric pockets 14 of relatively wide dimensions, and of generally triangular shape in top plan as disclosed in Figure 3. The outer corners of each pocket are secured to the side rungs of the front side of the ladder as at 15—15 in Figure 3.

Preferably the openings 13 and pockets 14 terminate in predetermined spaced relation with the lower end of the trough whereas the length of the trough is such that the lower end can be laid within a container or directly upon the ground, so that the fruit can properly roll therefrom onto the ground or within the container.

By reason of the staggered arrangement of the bumper plate 10, the fruit is caused to roll from side to side within the trough 6, thus retarding the descent thereof so that the fruit will not fall with great force within the container, it being preferable that the lower end of the trough be arranged within a fruit crate or box within the bottom of which is disposed an old sack or a piece of soft material so that the fruit first reaching the crate will not become bruised.

It will thus be seen that I have provided a highly novel, simple and extremely useful fruit picking device that is well adapted for all the purposes heretofore designated. Even though I have herein shown and described the invention as consisting of certain detail structural elements, it is nevertheless to be understood that minor changes may be made therein without affecting the spirit and scope of the appended claim.

I reserve the right to make this any length to adjust itself to height of trees; any size to adjust itself to any fruit; any number of feeding chutes to accommodate height of ladder. Also to make bumper plates at right angles in place of half around, whichever proves to be the most economical.

Having thus described the invention, what I claim as new is:

In combination, a propped step ladder including a ladder section and a prop section, connected together at their upper ends and adapted to be spread apart at their lower ends, a vertically disposed tubular chute secured at its upper end between the ladder and prop sections, adjacent their upper ends, and pocket structures, said structures each being secured at one of its ends to the chute and in communication therewith, and at its opposite end to one of the steps of the ladder section.

In testimony whereof I affix my signature.

CONDE A. BEUCLER.